United States Patent

Larsson

[15] 3,640,540
[45] Feb. 8, 1972

[54] TIGHTENING RING HAVING A RIGID LINER AND AN ELASTOMERIC RING MOUNTED THEREON

[72] Inventor: Hans Tord E. Larsson, Trelleborg, Sweden
[73] Assignee: STEFA Industri Aktiebolag, Landskrona, Sweden
[22] Filed: June 25, 1969
[21] Appl. No.: 836,306

[30] Foreign Application Priority Data

Jan. 13, 1969 Sweden.....................345/69

[52] U.S. Cl..................................277/25, 277/95
[51] Int. Cl............................................F16j 15/32
[58] Field of Search..........................277/25, 65, 82, 95

[56] References Cited

UNITED STATES PATENTS

| 2,415,888 | 2/1947 | Joy | 277/95 X |
| 2,657,104 | 10/1953 | Kayser | 277/95 X |
| 2,990,201 | 6/1961 | Stephens | 277/82 |

FOREIGN PATENTS OR APPLICATIONS

| 512,597 | 5/1955 | Canada | 277/95 |
| 1,071,374 | 3/1954 | France | 277/95 |
| 717,627 | 2/1942 | Germany | 277/95 |
| 1,025,999 | 4/1964 | Great Britain | 277/82 |

*Primary Examiner*—Edward J. Earls
*Attorney*—Prangley, Clayton, Mullin, Dithmar & Vogel

[57] ABSTRACT

A tightening ring for use around a shaft, including a liner having a portion adapted to engage the shaft and an elastomeric ring including a basic part carrying a hub part and at least one tightening lip carried by the hub part, the basic part having an inner surface which, in the tension-free state of the elastomeric ring, is inclined at an angle with respect to the axis of the tightening ring, the basic part being imbedded in the liner in a deformed condition to provide a secure connection between the liner and the elastomeric ring.

7 Claims, 9 Drawing Figures

PATENTED FEB 8 1972 3,640,540

Inventor
H. TORD E. LARSSON
BY
Prangley, Clayton, Mullin, Dithmar & Vogel
ATTYS.

TIGHTENING RING HAVING A RIGID LINER AND AN ELASTOMERIC RING MOUNTED THEREON

BACKGROUND OF THE INVENTION

Tightening rings may be used between a rotating shaft and a hub and comprise a ring made of an elastomer. The ring contains a basic part and a tightening lip extending therefrom, in which the basic part is inserted into a groove in a liner, usually made of metal, hard plastics or the like. The lips may be directed onto a vertical disc positioned on against the hub, whereas the ring is on the shaft; alternately the hub may be rotating, whereas the shaft is stationary, and the lip is placed on the basic part, which is arranged in connection with the hub, and that the lip will thus contact a recess or a disc or the like mounted on the shaft. An advantage of such tightening rings is supposed to be their ability to give very good tightening against oil or other mediums, so that these may not move from one side of the tightening to its other side simultaneously as the pressure from the tongue or lip against the contact surface may be kept very low, so that no strong wearing of the lip necessarily should occur.

For that reason it has also been proposed to arrange the lip with substantial material extending from the basic part, so that the distance through the elastomer from the basic part to the contact edge against the tightening surface of the lip will be great. Thereby it is possible to decrease the contact pressure between the edge of the lip and the contact surface, and as a consequence thereof the wearing of the edge of the lip has also decreased and the lift of the tightening ring has been increased.

In order that such a tightening ring should contact securely against its support, it should, however, be provided with a liner as above indicated, and the basic part of the ring should be under strong peripheral tension inside of said liner.

In practice it has now been proved, that these rings will often not function in the way intended, and it has been difficult to find the reason. Microscopic investigations have been conducted to determine how the tension lines run through the elastomeric part of the ring in the nontensioned state thereof as well as in the tensioned state of the ring inside of the liner. It has been found that displacements in these tension lines, for reasons not fully understood, will act in such a way that the contact edge of the lip is displaced relative to the surface against which it should tighten, and that thereby the tightening effect is lessened.

The present invention refers to an arrangement for preventing this disadvantage, and also to a method in connection with the production of a tightening ring, by which the said arrangement is provided.

According to the invention, as far as it regards the arrangement, the surface of the basic part of the elastomeric ring disposed on the bottom of the liner is inclined relative to said bottom in its relaxed or tension-free state, so that when the elastomeric ring is stored on the liner ring, the basic part of the elastomeric ring will be extended or shrunk more at one side than at the other side, and so that the difference in extension or shrinking will compensate for the displacement of the tension lines through the lip in full or in part.

According to the invention, as far as it regards the method, the elastomeric ring is moved with its basic part on the liner bottom at a time, when this bottom is completely cylindrical, in order that it should thereafter be bent or be lathed or pressed for forming a flange for retaining the basic part in stable position.

Further details of the invention will be evident from the following description of a number of different forms of execution of the invention in connection with the attached drawing, but it is understood that the invention is not limited to these specific forms of execution, but that all different kinds of modifications may occur within the frame of the invention.

In the drawings,

FIGS. 1–4 show a first form of execution of the invention,
FIG. 1 showing a section through the liner of a tightening ring without the elastomeric ring placed therein, FIG. 2 showing the elastomeric ring before it has been combined with the liner, FIG. 3 showing the liner and the ring in combination, however before the ring has been locked in its correct position by deformation of the liner, and FIG. 4 showing the ring and the liner in combination in their final state.

The liner 10 comprises an axial part 11 forming a cylinder and shaped to conform to the shaft, on which the tightening ring should be placed, as well as a radial part 12. The latter one is elongated by a part 13, which is not normally in contact with the elastomeric tightening ring, but which has for its purpose to protect this ring from sprinkles of oil and thereby to prevent erosion at the uppermost end of the tightening ring. The radial part 12 is displaced sidewardly at one place, so that a step is formed. The part of the radial ring, inside of said step, has been indicated 12', and the part outside of the step has been indicated 12''.

Figure 1:
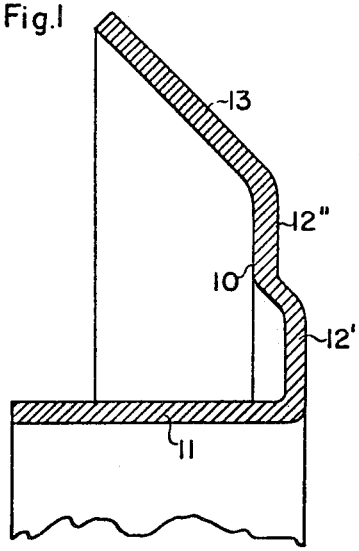
Figure 2:
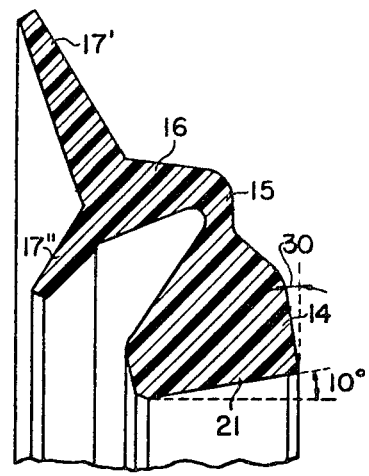
Figure 3:
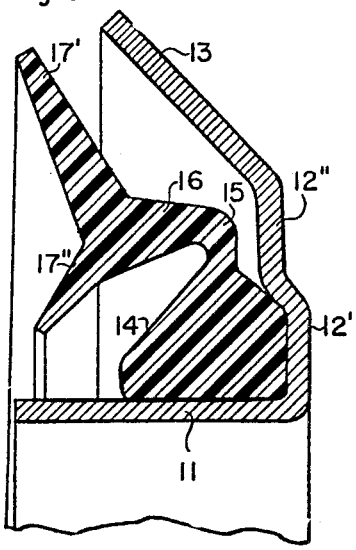
Figure 4:
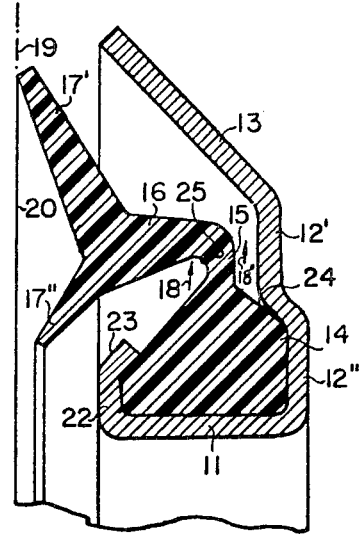

An elastomeric ring according to FIG. 2 is used with the liner shown in FIG. 1. This elastomeric ring comprises a basic part 14, a hub part 15, an approximately cylindrical part 16 and at least one tightening lip 17. In the form of execution shown in FIG. 2, the elastomeric ring has two tightening lips 17' and 17'', but this is in no way of decisive importance for the present invention. In order to explain the characteristic form of the elastomeric ring of the invention, reference shall now be made to FIG. 4. It was earlier known to provide a liner and an elastomeric ring moulded thereon, so that the resultant construction closely, but not in all respect, corresponded to the arrangement according to FIG. 4. In these tightening rings, however, noncalculatable tensions occurred in the elastomeric material during the moulding operation, which had little or no importance as long as the tension was in the basic part 14 or on the tightening lip 17' or 17''. However, the tension also occurred in the hub part 15 and to some extent in the cylindrical part 16, which tension varied from one sample to another one. This specifically caused different tensions to occur on the inner side and the outer side of the hub part 15 from one sample to another, represented by the two force arrows 18' and 18'', respectively, in FIG. 4. This caused a completely uncalculable pressure between the tightening lips and the vertically or radially standing tightening surfaces, which are indicated in FIG. 4 by means of the dash-dotted line 19, inside of the tightening lip 17' coinciding with the circular contour line 20, drawn in FIG. 4 with full lines. This could be avoided by dimensioning the hub part more rigidly, which in turn caused the tightening lips to be stiff. In order that the required tightening was obtained, the lips 17 and 17'' contacted the radial surface 19 with a pressure of such a magnitude as to cause excessive wear. As soon as a given degree of wear has occurred, the elastomeric part was more or less roughened, and the tightening was no longer adequate.

Investigations, which had been made to find out the reason for this irregularity, certainly have not given any distinct answer. One probable reason has been inner tensions in the basic part 14, which, dependent upon how the cooling after the moulding took place, would act in such way that the two forces 18' and 18'' had different values.

This is the disadvantage which is intended to be overcome by the present invention. This takes place by making the surface 21 on the basic part 14, which contacts the shaft, not cylindrical but rather conical with a given angular difference relative to the cylindrical outer surface of the shaft, the magnitude of said angular difference being dependent upon the specific dimensions in each case. A rather normal mean value of this angle will be about 10°, as indicated in FIG. 2. This value exists in the tension-free state. It is then also clear that the elastomeric ring cannot be moulded to the liner, but instead, these parts have been produced separately and only thereafter to be mounted together. When mounting them together, the hub part 11 of the liner extends axially beyond the ring, which after mounting will be bent on the basic part 14 of the elastomeric ring. The elastomeric ring is thereafter deformed, so that a rather high tension will surround the hub part 11 of the liner, and the inwardly facing surface 21 of the basic part 14 assumes a cylindrical form and rests with high pressure against the hub part 11 of the liner. As the elastomeric ring is, when mounted on the liner, in a stable state, the tensions within said ring may be calculated and found to be substantially higher than the tensions in the elastomeric ring after it has been moulded in the older manner, described above. A good balance between the tensions in the hub part 15 will be obtained and consequently also a stable position of the two tightening lips 17' and 17", or in the case that there is only one tightening lip, in this single tightening lip.

The basic part 11 has to be attached in one way or another to the liner part. One way of doing this is to vulcanize the basic part 14 to the cylindrical part 11 of the liner. Another simpler and more effective way is by a tension bond, whereby the basic part 14 is clamped under the step between the two parts 12' and 12" and the end of the cylindrical part 11 of the liner bent upwardly to form elements 22 and 23 to hold the basic part 14, as indicated in FIG. 4.

Forces in the basic part 14 other than those directed to its widening, in order that it can be so positioned onto the cylindrical part 11 of the liner, should be avoided. In this regard it is also advantageous, in the production of the elastomeric ring, to give the basic part such a form that it does not contact the parts of the liner to a higher degree than absolutely necessary, comprising the step between the parts 12' and 12" or parts situated outside thereof. In FIG. 4, therefore, it has also been shown that the step is separated from the elastomeric ring by a small angle 24.

The present invention is not directly concerned with whether one or two tightening lips 17' and 17" exist. The purpose of having two tightening lips is that at low-rotational speeds the tightening lip 17' should contact the tightening surface 19. If, however, for the reason mentioned above, the basic part 14 is arranged in such a way that the containing pressure is minimized in order to decrease the wearing of the free edge of the tightening lip 17', then at higher rotational speeds, the resultant increase in centrifugal force will cause the tightening lip 17' to be swung outwardly under peripheral tension and pivoting around a center indicated by the point 25. The tightening lip 17" is then swung outwardly, so that its edge will instead contact the tightening surface 20, which should take place before the contact has ceased between the tightening lip 17' and surface 19.

This detail is not directly pertinent to the present invention, but is being mentioned for the reason that in elastomeric rings, provided with two tightening lips 17' and 17" an essentially weaker contact pressure may exist between the edge of the tightening lip, and the tightening surface. For reasons evident from the above, the importance of the present invention becomes more significant as the contact pressure between the acting tightening lip and the tightening surface becomes weaker.

Figure 5:
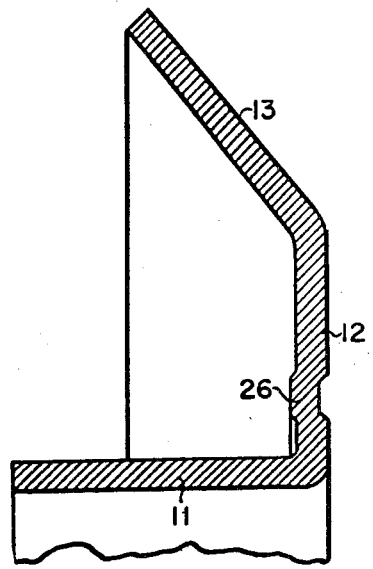
FIGS. 5, 6 and 7 show another form of execution, whereby FIG. 5 corresponds to FIG. 1, FIG. 6 corresponds to FIG. 2, and FIG. 7 corresponds to FIG. 4.
Figure 6:
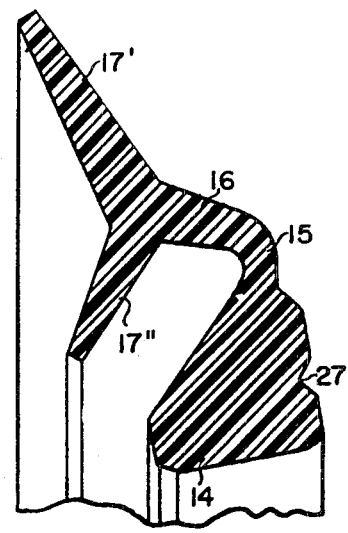
Figure 7:
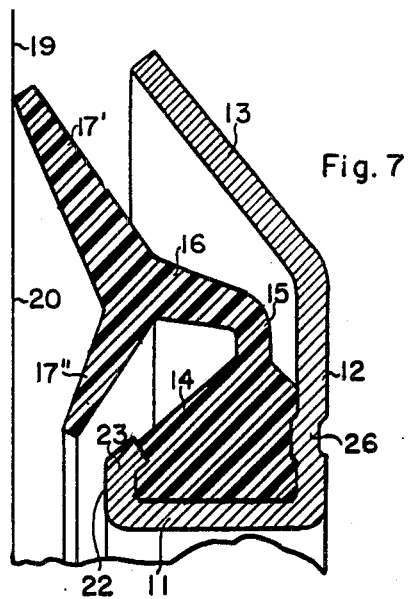

FIGS. 5, 6 and 7 together show a somewhat different form of execution of the present invention. Thus, there is no step in the hub part 12 of the liner according to FIG. 5, but instead a groove has been formed at 26. A circular groove of preferably triangular section 27, corresponding to said rolled groove, is arranged in the elastomeric ring according to FIG. 6, which is in all other respects the same as the elastomeric ring according to FIG. 2. FIG. 7 corresponds to FIG. 4 and shows how the basic part 14 of the elastomeric ring has been extended and placed upon the cylindrical hub part 11 of the liner, whereafter the free end of the part 11 has been bent outwardly and inwardly for forming the bond at the parts 22 and 23. It should be mentioned that the pressing in this case took place by an essentially higher force than in the arrangement according to FIG. 4 in order to obtain a good grip between the rolled groove 26 and the groove 27, whereby material in the basic part 14 is squeezed past the edge of the liner part 23, as seen in FIG. 7.

Figure 8:
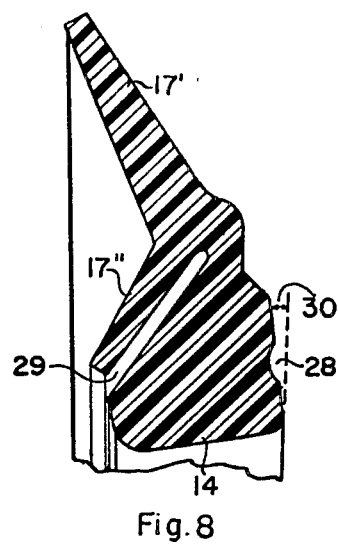
FIGS. 8 and 9 show one further form of execution of the invention, whereby FIG. 8 corresponds to FIG. 2, and FIG. 9 corresponds to FIG. 4.
Figure 9:
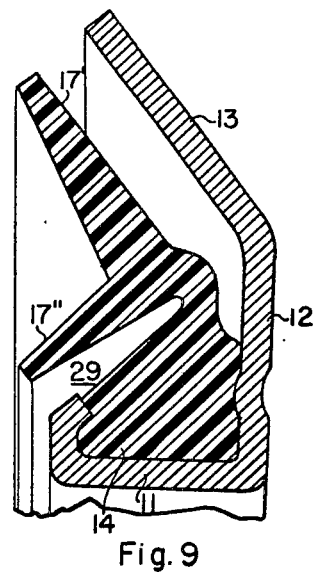

A further modification is shown in FIGS. 8 and 9. FIG. 8 corresponds to FIGS. 2 and 6. The groove 27 in FIG. 6, has in this case been replaced by a segment-formed groove 28, and the inner-tightening lip 17" is separated from the basic part 14 only by a rather narrow groove 29, which may be cut after the production of the elastomeric ring but before its mounting on the liner. The side of the basic part 14, which in the form of execution according to FIGS. 2 and 6 was radially directed has now been given a smaller inclination in the form of the angle 30, which adds to the tightening lip 17' when mounted on the liner being swung a little outwardly, as is also seen from FIG. 9. The groove 29 is therefore also widened a little. The parts 15 and 16 of the elastomeric ring have, in this form of execution, practically been combined into one single part.

The angle 30 may be in the order of magnitude between 6° and 14°.

What is claimed is:

1. A tightening ring for use on a shaft, comprising a substantially rigid liner including a cylindrical portion having an opening therethrough for receiving the shaft, and an elastomeric ring including a base portion and a hub portion carried by said base portion and at least one surface-engaging tightening lip carried by said hub portion, said base portion having an opening therethrough defined by an inwardly facing surface conically shaped in the relaxed condition of said elastomeric ring to enable it to be slipped onto the cylindrical portion of said liner, said opening having a first smaller diameter at one end thereof and a second larger diameter at the other end thereof, said tightening lip facing the same axial direction as does the smaller end of said conically shaped opening, said elastomeric ring being deformed to cause said conically shaped surface to assume the cylindrical shape of the cylindrical portion of said liner, said hub portion having a thickness less than the thickness of said base portion so that said tightening lip moves about a point in said hub portion, whereby said elastomeric ring is stressed to provide improved sealing between the tightening lip and the surface it is to engage, and means for retaining said elastomeric ring on said liner in said deformed condition.

2. The tightening ring set forth in claim 1, wherein said liner includes a pair of axially spaced apart outwardly extending walls respectively on the ends of said cylindrical portion, said elastomeric ring being disposed between said walls.

3. The tightening ring set forth in claim 2, wherein said means includes a projection on one of said walls and a mating groove on said base portion for receiving said projection.

4. The tightening ring set forth in claim 2, wherein the outer end of one of said walls is bent to engage the adjacent surface of said base portion and thereby define said means.

5. The tightening ring set forth in claim 2, wherein said elastomeric ring includes an outwardly directed surface which is inclined relative to a plane normal to the axis of said tightening ring and which mates with the surface on the adjacent one of said outwardly extending walls.

6. The tightening ring set forth in claim 5, wherein the angle of inclination of said second surface is in the range of about 6° to about 14°.

7. The tightening ring set forth in claim 1, wherein the angle of inclination of said inwardly facing first surface with respect to the axis of said tightening ring is on the order of about 10° in the relaxed condition of said elastomeric ring.

* * * * *